US008125100B2

(12) United States Patent
Suzuki et al.

(10) Patent No.: US 8,125,100 B2
(45) Date of Patent: Feb. 28, 2012

(54) ELECTRIC POWER-FEEDING STRUCTURE WITH A WIRE ROUTING ALONG AN ARM

(75) Inventors: Kaoru Suzuki, Kosai (JP); Atsuyoshi Yamaguchi, Kosai (JP); Takehiko Uehara, Toyota (JP)

(73) Assignee: Yazaki Corporation, Tokyo (JP)

( * ) Notice: Subject to any disclaimer, the term of this patent is extended or adjusted under 35 U.S.C. 154(b) by 335 days.

(21) Appl. No.: 12/207,295

(22) Filed: Sep. 9, 2008

(65) Prior Publication Data

US 2009/0066155 A1    Mar. 12, 2009

(30) Foreign Application Priority Data

Sep. 10, 2007    (JP) .................................. 2007-234119

(51) Int. Cl.
*B60L 1/00* (2006.01)
*B60L 3/00* (2006.01)
*H02G 3/00* (2006.01)

(52) U.S. Cl. ........................... 307/9.1; 307/10.1; 49/351

(58) Field of Classification Search .................. None
See application file for complete search history.

(56) References Cited

U.S. PATENT DOCUMENTS

| | | | | | |
|---|---|---|---|---|---|
| 3,724,133 | A | * | 4/1973 | Shirai et al. | 49/349 |
| 3,782,037 | A | * | 1/1974 | Heesch | 49/103 |
| 3,816,962 | A | * | 6/1974 | Ladd et al. | 49/103 |
| 4,823,507 | A | * | 4/1989 | Miller | 49/227 |
| 4,939,867 | A | * | 7/1990 | Harada et al. | 49/349 |
| 5,201,144 | A | * | 4/1993 | Krajenke | 49/351 |
| 5,255,470 | A | * | 10/1993 | Dupuy | 49/227 |
| 6,513,285 | B2 | * | 2/2003 | Isomura | 49/351 |
| 6,658,795 | B2 | * | 12/2003 | Jung | 49/375 |
| 7,017,303 | B2 | * | 3/2006 | Cho | 49/351 |
| 7,224,136 | B2 | * | 5/2007 | Saitou et al. | 318/286 |
| 7,530,825 | B2 | * | 5/2009 | Sato et al. | 439/162 |
| 2002/0020115 | A1 | * | 2/2002 | Isomura | 49/213 |
| 2003/0014921 | A1 | * | 1/2003 | Jung | 49/349 |
| 2003/0140561 | A1 | * | 7/2003 | Kawashima et al. | 49/351 |
| 2007/0144073 | A1 | * | 6/2007 | Munezane et al. | 49/349 |
| 2007/0148992 | A1 | * | 6/2007 | Sato et al. | 439/34 |
| 2009/0066156 | A1 | * | 3/2009 | Suzuki et al. | 307/10.1 |
| 2009/0066167 | A1 | * | 3/2009 | Suzuki et al. | 307/147 |

FOREIGN PATENT DOCUMENTS

| | | | |
|---|---|---|---|
| JP | 61-60345 A | | 3/1986 |
| JP | 61-060345 A | * | 3/1986 |
| JP | 2002-307369 A | | 10/2002 |
| JP | 2005-57828 A | | 3/2005 |

OTHER PUBLICATIONS

Extended European Search Report dated Jan. 22, 2009.

\* cited by examiner

*Primary Examiner* — Rexford Barnie
*Assistant Examiner* — Justen Fauth
(74) *Attorney, Agent, or Firm* — Sughrue Mion, PLLC

(57) ABSTRACT

An electric power-feeding structure for feeding electric power to a moving body which is driven to be raised or lowered, includes: an arm having a distal end connected to the moving body movably in a direction perpendicular to a raising or lowering direction of the moving body and a proximal end adapted to be rotatably driven so as to swing, to thereby drive the raising or lowering of the moving body. An electrical wire is routed alongside the arm, and one end of the electrical wire extending from the distal end of the arm is connected to the moving body to feed electric power to the moving body. The electrical wire is routed alongside a side surface of the arm.

12 Claims, 7 Drawing Sheets

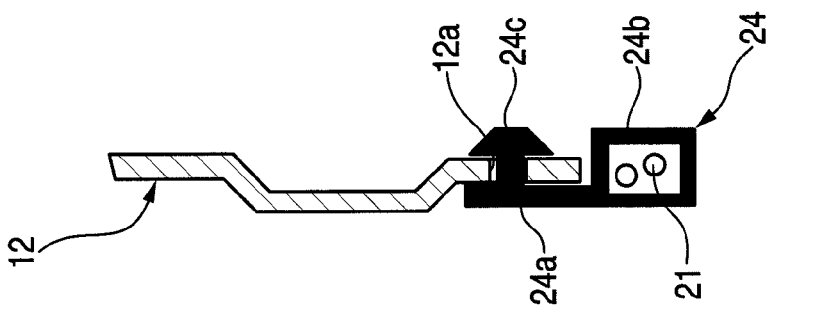
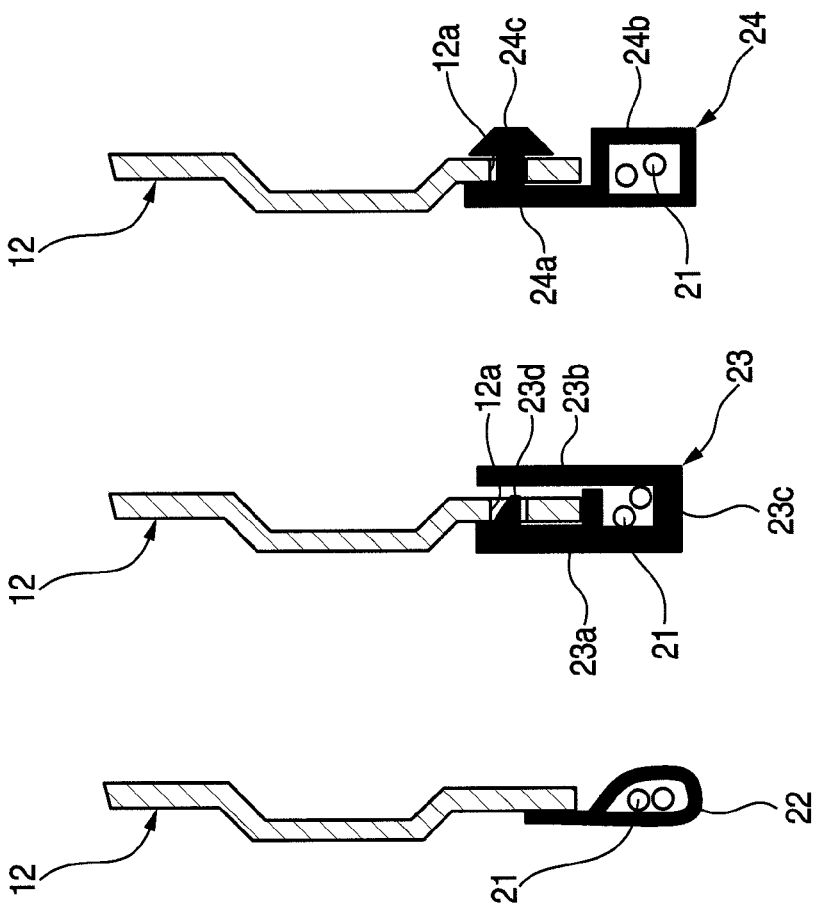
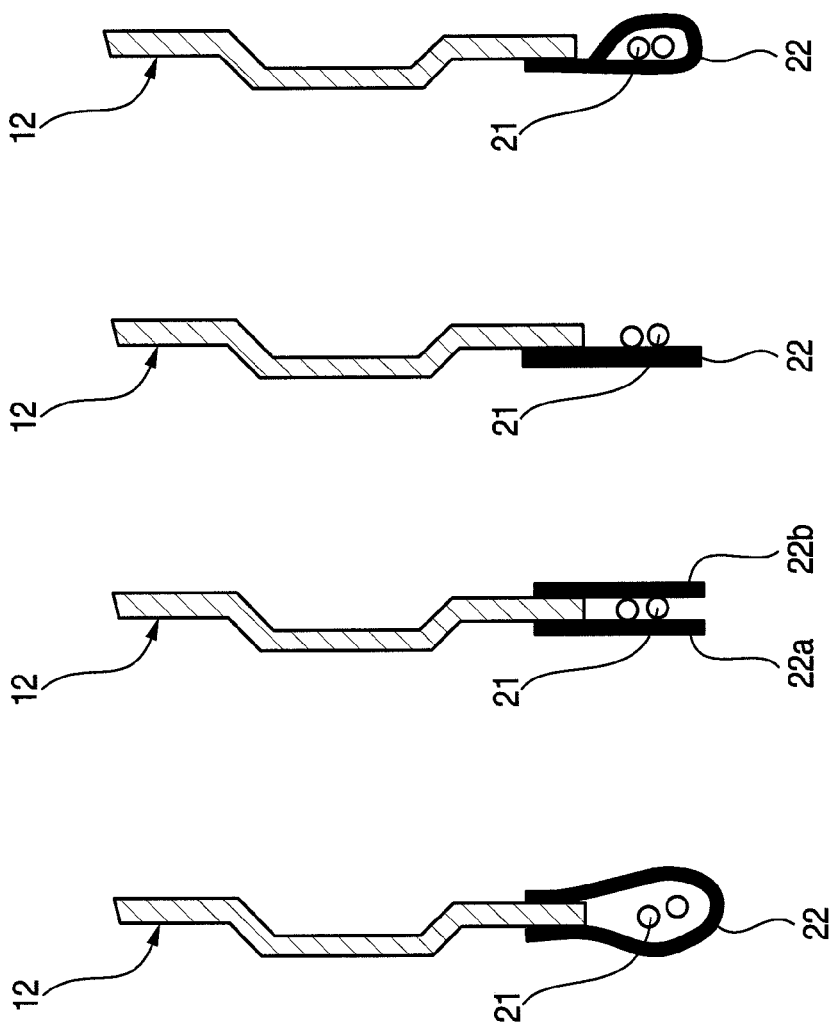

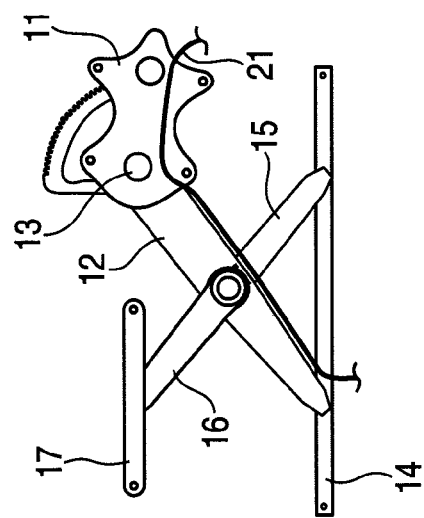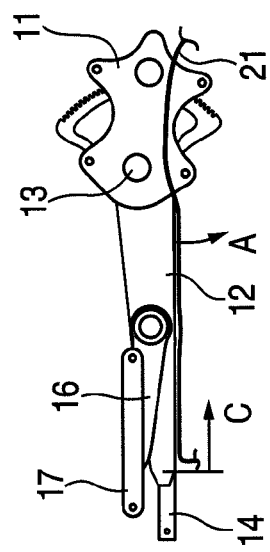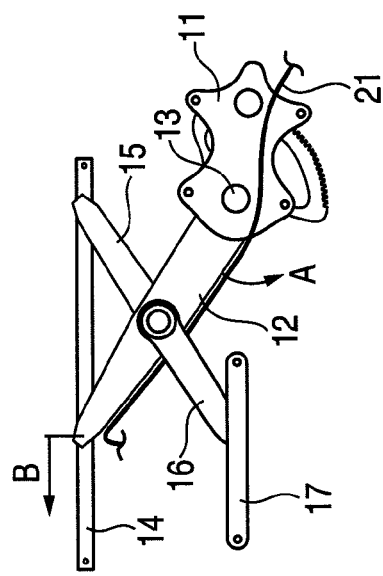

ELECTRIC POWER-FEEDING STRUCTURE WITH A WIRE ROUTING ALONG AN ARM

BACKGROUND OF THE INVENTION

1. Technical Field

The present invention relates to an electric power-feeding structure for feeding electric power to a moving body which is driven to be raised or lowered, such as a window glass of a motor vehicle.

2. Background Art

In the window glass of a motor vehicle, such as an automobile, electric power is fed to the window glass in which a heating wire is laid for such as the prevention of dew condensation. As an electric power-feeding structure for feeding electric power to the window glass in cases such as where the heating wire is laid in the window glass which is driven to be raised or lowered, an electric power-feeding structure shown in FIGS. 7A and 7B is conventionally known.

In the electric power-feeding structure shown in FIGS. 7A and 7B, a moving body-side connector 105 provided on a window glass 102 which is disposed in an inner space of a door 101 and is driven to be raised or lowered, and a door-side connector 106 provided in the door 101 are connected via a feeding line to feed electric power to the window glass 102. Looseness is produced in the feeding line in conjunction with the raising or lowering of the window glass 102, and in a case where the amount of looseness is large and if such a feeding line is able to move without any restriction, there is a possibility of causing a malfunction such as the feeding line becoming bitten by a raising and lowering mechanism of the window glass 102. For this reason, the looseness produced in the feeding line is restricted by an excess-length absorbing device 103 disposed in the inner space of the door 101.

The excess-length absorbing device 103 is so configured that the feeding line is accommodated in a case 111 in such a manner as to be turned back in a U-shape along the raising or lowering direction of the window glass 102. On end portion side (indicated by reference numeral 104 in the drawings) of the feeding line is held by a sliding member 112 engaged with the case 111 movably in the raising or lowering direction of the window glass 102, is led out from the case 111, and is connected to the moving body-side connector 105. The sliding member 112 moves vertically while being accompanied by the deformation of the feeding line turned back in the U-shape inside the case 111, and the feeding line 104 follows the raising or lowering of the window glass 102. Although looseness is produced in the feeding line within the case 111 in conjunction with the vertical movement of the sliding member 112, its movement is restricted to within the case 111, and the biting by the raising and lowering mechanism of the window glass 102 is prevented (refer to patent document 1).

[Patent Document 1] JP-A-2005-57828

In the electric power-feeding structure disclosed in the patent document 1, the feeding line is accommodated in the case 111 in such a manner as to be turned back in the U-shape along the raising or lowering direction of the window glass 102 to cope with the raising or lowering of the window glass 102. In this case, an excess length by at least more than half the stroke of the window glass 102 is required for the feeding line, and the amount of looseness produced in the feeding line in conjunction with the raising or lowering of the window glass 102 is also relatively large. For this reason, the case 111 for accommodating the feeding line is necessary, and the case 111 becomes large in size. It is difficult to further secure an accommodation space for the case 111 in the inner space of the door 101 in which the window glass 102 and its raising and lowering mechanism are accommodated.

SUMMARY OF THE INVENTION

The present invention has been devised in view of the above-described circumstances, and its object is to provide a miniaturized and simplified electric power-feeding structure for feeding electric power to a moving body which is driven to be raised or lowered.

To attain the above object, in accordance with an aspect of the invention there is provided an electric power-feeding structure for feeding electric power to a moving body which is driven to be raised or lowered, including: an arm having a distal end connected to the moving body movably in a direction perpendicular to a raising or lowering direction of the moving body and a proximal end adapted to be rotatably driven so as to swing, to thereby drive the raising or lowering of the moving body, wherein an electrical wire is routed alongside the arm, and one end of the electrical wire extending from the distal end of the arm is connected to the moving body to feed electric power to the moving body, and wherein the electrical wire is routed alongside a side surface of the arm.

In the electric power-feeding structure in accordance with the invention, the electrical wire is routed alongside the arm which drives the raising or lowering of the moving body, so that a major portion of the electrical wire which follows the raising and lowering of the moving body can be restricted by the arm. Accordingly, a member for restricting the movement of the electrical wire, such as a case for accommodating the electrical wire, is not separately required, so that it is possible to miniaturize and simplify the electric power-feeding structure. In addition, the electrical wire is routed alongside the side surface of the arm, and moves on the locus of the swinging motion of the arm in conjunction with the swinging motion of the arm. Accordingly, the electrical wire does not interfere with the moving body and other elements making up the raising and lowering mechanism of that moving body, and it is possible to narrow the gap between the arm and each of the moving body and the other elements making up the raising and lowering mechanism of that moving body, thereby making it possible to further miniaturize the electric power-feeding structure.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein:

FIGS. 5A to 5F are cross-sectional views of an arm of the raising and lowering mechanism shown in FIG. 3;

FIGS. 6A to 6C are schematic views illustrating the operation of the electric power-feeding structure shown in FIG. 3 in conjunction with the raising or lowering of the window glass.

DETAILED DESCRIPTION OF THE PREFERRED EMBODIMENTS

Referring now to the accompanying drawings, a description will be given of a preferred embodiment of an electric power-feeding structure in accordance with the invention.

Figure 1:
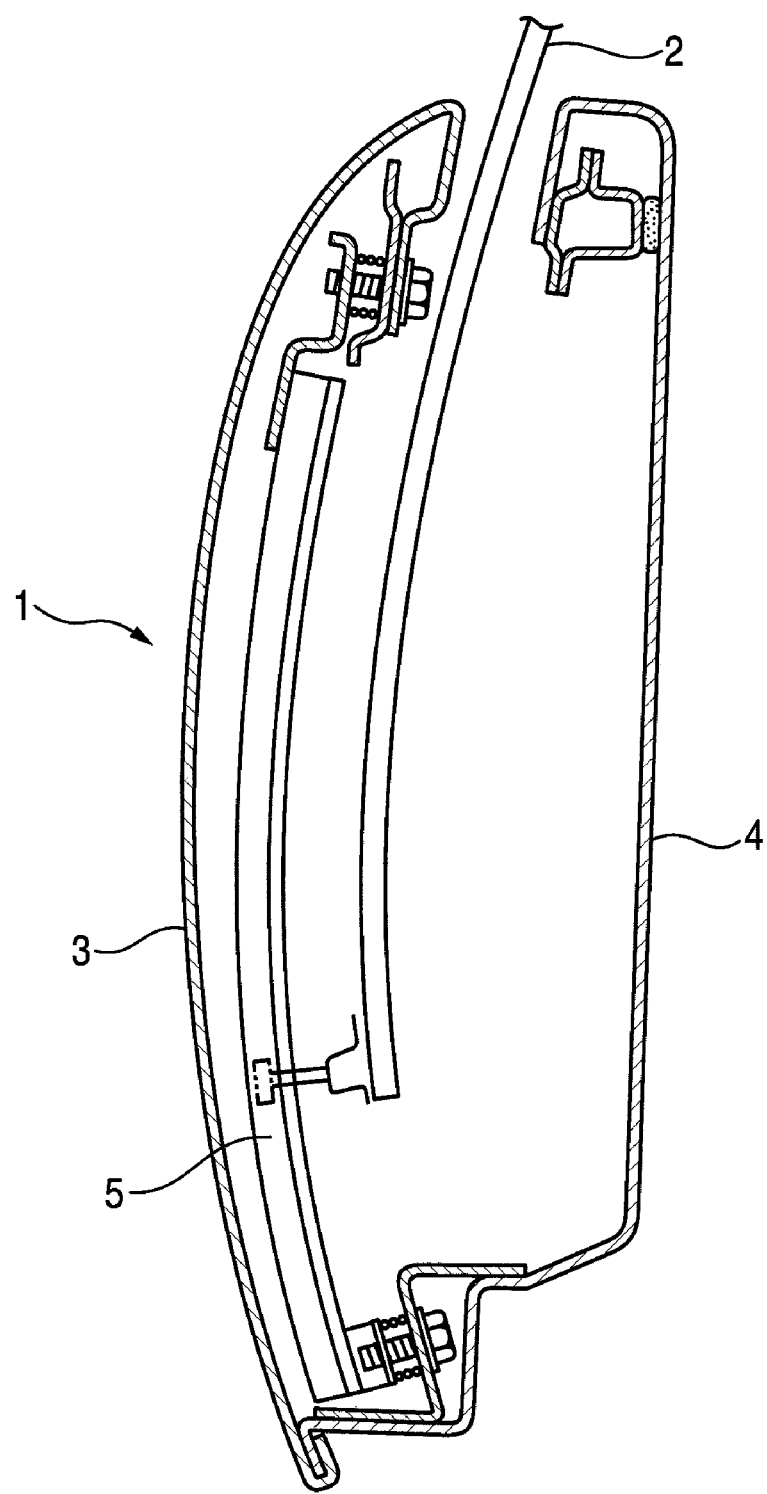
FIG. 1 is a cross-sectional view of a door of an automobile to which the electric power-feeding structure in accordance with the invention is applied.
Figure 2:
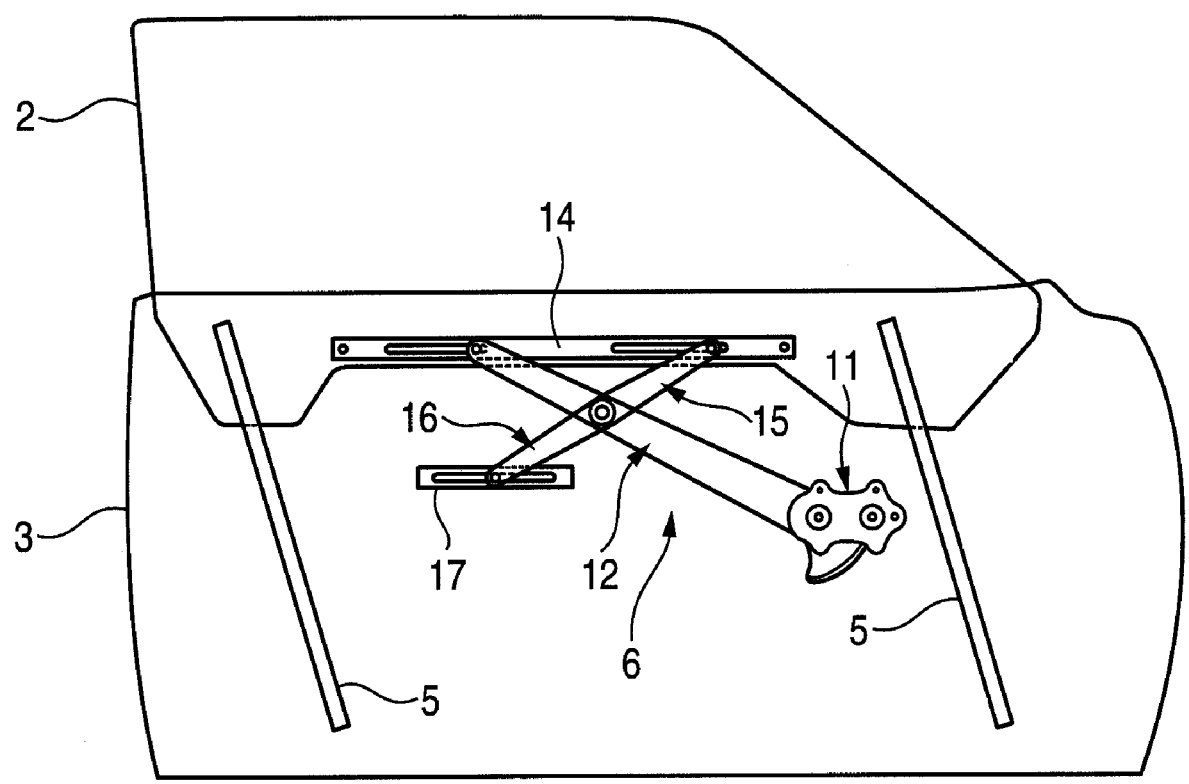
FIG. 2 is a front elevational view illustrating a raising and lowering mechanism of a window glass of the door shown in FIG. 1.
Figure 3:
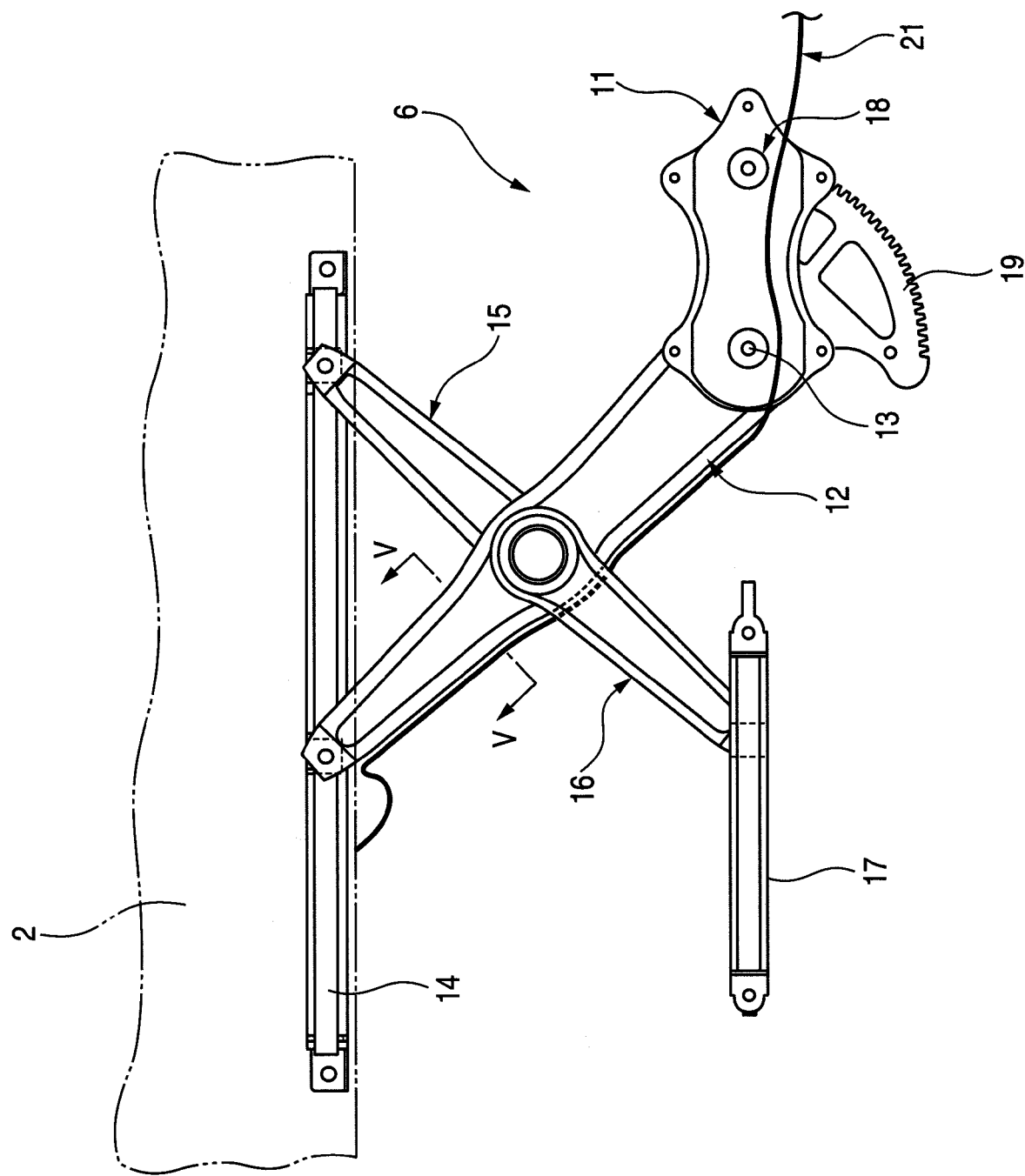
FIG. 3 is a detailed front elevational view of the raising and lowering mechanism shown in FIG. 2 and illustrates an embodiment of the electric power-feeding structure in accordance with the invention.
Figure 4:
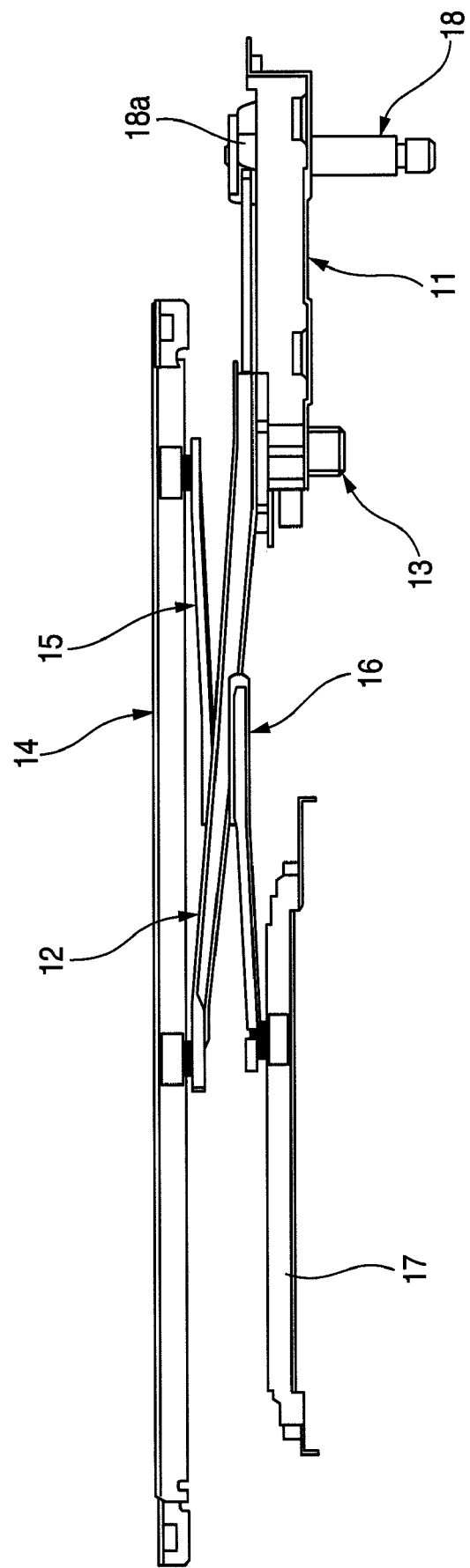
FIG. 4 is a plan view of the raising and lowering mechanism shown in FIG. 3.
Figure 7A:
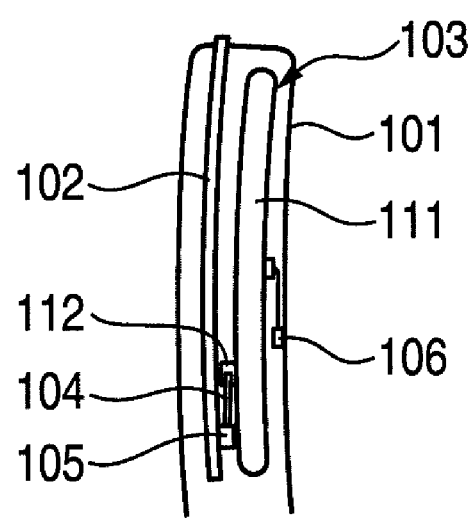
FIGS. 7A and 7B are cross-sectional views of a door of an automobile illustrating a conventional electric power-feeding structure.
Figure 7B:
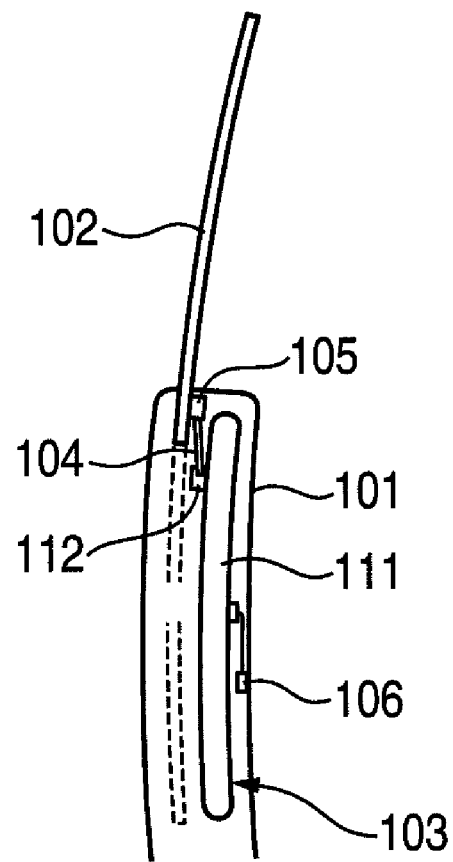

FIG. 1 is a cross-sectional view of a door of an automobile to which the electric power-feeding structure in accordance with the invention is applied. FIG. 2 is a front elevational view illustrating a raising and lowering mechanism of a window glass of the door shown in FIG. 1. FIG. 3 is a detailed front elevational view of the raising and lowering mechanism shown in FIG. 2 and illustrates an embodiment of the electric power-feeding structure in accordance with the invention. FIG. 4 is a plan view of the raising and lowering mechanism shown in FIG. 3. FIGS. 5A to 5F are cross-sectional views of an arm of the raising and lowering mechanism shown in FIG. 3. FIGS. 6A to 6C are schematic views illustrating the operation of the electric power-feeding structure shown in FIG. 3 in conjunction with the raising or lowering of the window glass.

As shown in FIGS. 1 and 2, the electric power-feeding structure in accordance with this embodiment is provided in the door of the automobile, and is adapted to feed electric power to the window glass which is disposed in this door and is driven to be raised or lowered. Hereafter, a description will be given of the raising and lowering mechanism of the window glass.

A door panel 1 is constructed such that an outer panel 3 and an inner panel 4, which are respectively press-formed into predetermined shapes, are joined, and a required space is formed therein.

A window glass 2 is interposed between the outer panel 3 and the inner panel 4, and is driven to be raised or lowered in a substantially vertical direction by the raising and lowering mechanism which will be described later. The window glass 2 is thereby made to emerge outside the door panel 1 through the gap between the outer panel 3 and the inner panel 4, which corresponds to an upper edge of the door panel 1, and dives back down into the inner space of the door panel 1.

A pair of glass guides 5 respectively extending in the substantially vertical direction are disposed between the window glass 2 and the outer panel 3 at a predetermined interval therebetween in a forward-backward direction, i.e., a longitudinal direction of the automobile. The movement of the window glass 2 in the substantially vertical direction is guided with its lower end engaged with the pair of glass guides 5.

Further, a window regulator (raising and lowering mechanism) 6 for driving the raising and lowering of the window glass 2 is disposed in the inner space of the door panel 1.

Referring further to FIGS. 3 and 4, the window regulator 6 is a window regulator of the so-called X-arm type and has a base plate 11 which is fixed to the door panel 1, a main arm 12 which is rotatably supported by this base plate 11, and a pair of auxiliary arms 15 and 16 which are rotatably supported by this main arm 12.

The main arm 12 is rotatably supported by the base plate 11 through a rotating shaft 13 provided at its proximal end. A distal end of the main arm 12 is coupled to a rail 14 fixed to a lower end portion of the window glass 2 and extending in the substantially forward-backward direction. The distal end of the main arm 12 is movable in the substantially forward-backward direction along the rail 14.

One auxiliary arm 15 and the other auxiliary arm 16 are respectively located on the obverse surface side and the reverse surface side of the main arm 12, and are respectively disposed to extend in a rectilinear direction and intersect the main arm 12 substantially in the form of an X-shape. Further, the pair of auxiliary arms 15 and 16 have their respective proximal ends supported rotatably by a substantially longitudinally central portion of the main arm 12 so as to rotate mutually coaxially and integrally.

In the same way as the distal end of the main arm 12, a distal end of the auxiliary arm 15 is coupled to the rail 14 fixed to the lower end portion of the window glass 2 and extending in the substantially forward-backward direction, and is movable in the substantially forward-backward direction along the rail 14. Meanwhile, a distal end of the auxiliary arm 16 is coupled to a rail 17 fixed to the door panel 1 and extending in the substantially forward-backward direction in parallel with the rail 14, and is movable in the substantially forward-backward direction along the rail 17.

A driving mechanism 18 is provided on the base plate 11. This driving mechanism 18 includes a driving source (which is not shown) such as a motor or a manual handle, as well as a pinion gear 18a which is rotated by the operation of this driving source. Further, a sector gear 19 is secured to the proximal end of the main arm 12 so as to rotate integrally therewith, and this sector gear 19 meshes with the pinion gear 18a of the driving mechanism 18.

In the above-described configuration, when the driving source of the driving mechanism 18 is operated, the main arm 12 is rotatably driven and is swung by the meshing between the pinion gear 18a of the driving mechanism 18 and the sector gear 19. In conjunction with the swinging motion of the main arm 12, the distal end of the main arm 12 moves in the forward-backward direction along the rail 14, and moves the rail 14 in the vertical direction. As a result, the window glass 2 is raised or lowered.

In a state in which the pair of auxiliary arms 15 and 16 are sandwiched between the rail 14 which is vertically moved and the rail 17 which is fixed to the door panel 1, the pair of auxiliary arms 15 and 16 rotate integrally while their respective distal ends are moved in the forward-backward direction along the rails 14 and 17 in conjunction with the vertical movement of the rail 14, allowing the posture of the rail 14 to be maintained. As a result, the window glass 2 is raised or lowered stably.

An electrical wire 21 for feeding electric power to the window glass 2 which is driven to be raised or lowered is passed by, for example, a vicinity of a hinge mechanism installed on a vehicle body while openably supporting the door panel 1, and is introduced from the vehicle body side into the inner space of the door panel 1. Then, the electrical wire 21 is routed alongside the main arm 12 and is connected to the window glass 2. Specifically, the electrical wire 21 has its predetermined portion fixed to the base plate 11, is passed by a vicinity of the rotating shaft 13 of the main arm 12, reaches the distal end of the main arm 12 alongside one side surface of the main arm 12, is extended from the distal end of the main arm 12, and is connected to the lower end portion of the window glass 2.

The electrical wire 21 is fixed to the main arm 12 in an entire region or a plurality of portions of the side surface of the main arm 12 alongside which the electrical wire 21 extends. The fixing means is not particularly limited, but it is possible to use such as an adhesive tape or clips, for example. The electrical wire at its portion connected to the window glass 2 may be directly fixed to the lower end portion of the window glass 2, or may be connected to the window glass 2 by being fixed to an attachment member of the window glass 2 such as the rail 14.

In the examples shown in FIGS. 5A to 5D, the electrical wire 21 is fixed to the main arm 12 by using an adhesive tape. In FIG. 5A, a single adhesive tape 22 is bent back substantially in a U-shape and is adhered to both obverse and reverse surfaces of the side end portion of the main arm 12, and the electrical wire 21 is tucked inside it so as to be retained. In FIG. 5B, the electrical wire 21 is clamped and retained between two adhesive tapes 22a and 22b whose one ends are respectively adhered to the obverse surface and the reverse surface of the side end portion of the main arm 12. In FIG. 5C, the electrical wire 21 is adhered and retained by an adhesive surface at one end of the single adhesive tape 22 whose other end is adhered to the obverse surface or the reverse surface of the side end portion of the main arm 12. In FIG. 5D, the electrical wire 21 is tucked in and retained by one end of the single adhesive tape 22 whose other end is adhered to the obverse surface or the reverse surface of the side end portion of the main arm 12.

In addition, in the examples shown in FIGS. 5E and 5F, the electrical wire 21 is fixed to the main arm by using a clip. A clip 23 shown in FIG. 5E has a pair of clamping pieces 23a and 23b for clamping the side end portion of the main arm 12 from its both obverse and reverse surface sides, as well as a connecting piece 23c which connects together the pair of clamping pieces 23a and 23b. A retaining pawl 23d is projected on that surface of one clamping piece 23a of the clip 23 which opposes the clamping piece 23b. The retaining pawl 23d is retainably inserted in a through hole 12a formed in the side end portion of the main arm 12, the pair of clamping pieces 23a and 23b are secured to the main arm 12 by clamping the side end portion of the main arm 12, and the electrical wire 21 is accommodated in a gap formed between the connecting piece 23c and the side surface of the main arm 12, thus allowing the clip 23 to retain the electrical wire 21. A clip 24 shown in FIG. 5F has a supporting piece 24a extending alongside the reverse surface of the side end portion of the main arm 12, as well as a holding frame 24b which is provided continuously from a leading end of the supporting piece 24a and is disposed adjacent to the side surface of the main arm 12. A retaining projection 24c is projected on the supporting piece 24a. The retaining projection 24c is passed through the through hole 12a, which is formed in the side end portion of the main arm 12, from the reverse surface side toward the obverse surface side, and is secured to the main arm 12 by being engaged with a peripheral edge portion on the obverse surface side of the through hole 12a, and the electrical wire 21 is accommodated inside the holding frame 24b, thus allowing the clip 24 to retain the electrical wire 21.

Next, referring to FIGS. 6A to 6C, a description will be given of the operation of the electric power-feeding structure in accordance with this embodiment. FIG. 6A shows a state of the window regulator 6 when the window glass 2 is closed. FIG. 6B shows a state of the window regulator 6 when the window glass 2 is half open. FIG. 6C shows a state of the window regulator 6 when the window glass 2 is fully open.

From the state of the window regulator 6 shown in FIG. 6A, the main arm 12 is swung in the direction of arrow A as its proximal end is rotatably driven. In conjunction with the swinging motion of the main arm 12 in the direction of the arrow A, as sequentially shown in FIGS. 6B and 6C, the distal end of the main arm 12 reciprocally moves in the directions of arrows B and C along the rail 14 and lowers the rails 14. As a result, the window glass 2 is lowered and opened.

Further, in the state in which the pair of auxiliary arms 15 and 16 are sandwiched between the rail 14 which is lowered and the rail 17 which is fixed to the door panel 1, the pair of auxiliary arms 15 and 16 rotate integrally while their respective distal ends are moved in the forward-backward direction along the rails 14 and 17 in conjunction with the lowering of the rail 14. In that process, the auxiliary arm 15 passes over the obverse surface of the main arm 12, and the auxiliary arm 16 passes over the reverse surface of the main arm 12. However, the electrical wire 21 is secured alongside the side surface of the main arm 12, so that the interference between the electrical wire 21 and the auxiliary arms 15 and 16 is avoided. Accordingly, it is possible to narrow the gap between the main arm 12 and each of the auxiliary arms 15 and 16.

As described above, according to the electric power-feeding structure of this embodiment, the electrical wire is routed alongside the arm which drives the raising or lowering of the moving body, so that a major portion of the electrical wire which follows the raising and lowering of the moving body can be restricted by the arm. Accordingly, a member for restricting the movement of the electrical wire, such as a case for accommodating the electrical wire, is not separately required, so that it is possible to miniaturize and simplify the electric power-feeding structure. In addition, the electrical wire is routed alongside the side surface of the arm, and moves on the locus of the swinging motion of the arm in conjunction with the swinging motion of the arm. Accordingly, the electrical wire does not interfere with the moving body and other elements making up the raising and lowering mechanism of that moving body, and it is possible to narrow the gap between the arm and each of the moving body and the other elements making up the raising and lowering mechanism of that moving body, thereby making it possible to further miniaturize the electric power-feeding structure.

It should be noted that the invention is not limited to the above-described embodiment, and modifications, improvements, and the like are possible, as required. In addition, the shapes, dimensions, numerical values, forms, numbers, places of disposition, and the like of the respective constituent elements in the above-described embodiment are arbitrary and are not limited insofar as they are capable of attaining the invention.

For example, although in the above-described embodiment a description has been given of the example in which the invention is applied to the X-arm type window regulator 6 having the main arm 12 and the pair of auxiliary arms 15 and 16, the invention is also similarly applicable to a single-arm type window regulator having only the main arm 12.

What is claimed is:

1. An electric power-feeding structure for feeding electric power to a moving body which is driven in a first direction, comprising:
   a main arm having a distal end connected to the moving body slidably in a direction perpendicular to the first direction with respect to the moving body and a proximal end adapted to be rotatably driven so as to swing the main arm, to thereby control movement of the moving body in the first direction; and
   an auxiliary arm connected to the main arm to define an X-shaped arm and rotated in accordance with a rotation of the main arm,
   wherein an electrical wire is routed alongside the main arm, and one end of the electrical wire extending from a side of the distal end of the main arm is connected to the moving body to feed electric power to the moving body, wherein the main arm rotates in a rotating plane, wherein the main arm has a front surface and a back surface which are opposite one another and are substantially parallel to the rotating plane, wherein the main arm has a pair of side surfaces interconnecting the front surface to the back surface, and wherein the electrical wire is routed alongside one of the pair of side surfaces of the main arm at least at an intersection of the main arm and the auxiliary arm.

2. The electric power-feeding structure according to claim 1, wherein a drive mechanism is connected to the main arm to rotate the main arm.

3. The electric power-feeding structure according to claim 2, wherein the main arm has a fixed pivot about which the main arm rotates, and wherein the fixed pivot does not move relative to the drive mechanism.

4. The electric power-feeding structure according to claim 3, wherein the auxiliary arm rotates about a second pivot provided on the main arm, and wherein the electrical wire is routed alongside the side surface of the main arm from either the distal or proximal end of the arm to at least the second pivot.

5. The electric power-feeding structure according to claim 2, wherein the drive mechanism contacts the main arm.

6. The electric power-feeding structure according to claim 1, further comprising:

a fixing unit which is attached to the main arm to fix the electrical wire to the main arm.

7. The electric power-feeding structure according to claim 6, wherein the fixing unit accommodates the electrical wire therein to fix the electrical wire to the main arm.

8. The electric power-feeding structure according to claim 7, wherein the fixing unit includes a first engaging portion, and wherein the main arm includes a second engaging portion engaged with the first engaging portion.

9. The electric power-feeding structure according to claim 1, wherein the electrical wire is routed alongside the side surface of the main arm over at least a half of a length of the side surface.

10. The electric power-feeding structure according to claim 1, wherein the electrical wire is routed alongside the side surface of the main arm from the distal end of the main arm to the proximal end of the main arm.

11. The electric power-feeding structure according to claim 1, wherein the auxiliary arm includes a pair of auxiliary arms, one being connected to the front surface of the main arm and the other being connected to the back surface of the main arm.

12. The electric power-feeding structure according to claim 11, wherein each proximal end of the pair of auxiliary arms is supported rotatably by a substantially longitudinally central portion of the main arm.

* * * * *